United States Patent [19]

Hikawa

[11] Patent Number: 4,819,090
[45] Date of Patent: Apr. 4, 1989

[54] DIGITAL SIGNAL REPRODUCING APPARATUS

[75] Inventor: Kazuo Hikawa, Mitaka, Japan

[73] Assignee: Victor Company of Japan, Kanagawa, Japan

[21] Appl. No.: 103,921

[22] Filed: Oct. 1, 1987

[30] Foreign Application Priority Data

Oct. 2, 1986 [JP] Japan .................................. 61-234958
Oct. 13, 1986 [JP] Japan .................................. 61-242522

[51] Int. Cl.⁴ ............................................... G11B 5/09
[52] U.S. Cl. ......................................... 360/32; 360/51
[58] Field of Search .............................. 360/32, 49, 51

[56] References Cited

U.S. PATENT DOCUMENTS 4,766,507 8/1988 Kashida et al. ...................... 360/32

Primary Examiner—Vincent P. Canney
Attorney, Agent, or Firm—Michael N. Meller

[57] ABSTRACT

A digital signal reproducing apparatus comprises a block address counter which is reset immediately before reproduction of a subcode region on a magnetic tape and a PCM data region to start a counting operation therefrom, and the counting operation of the block address counter is stopped when each of the subcode region and the PCM data region ends, so that the reproduced block address can be written into a random access memory while correcting the block address without the need of a decoding circuit.

5 Claims, 8 Drawing Sheets

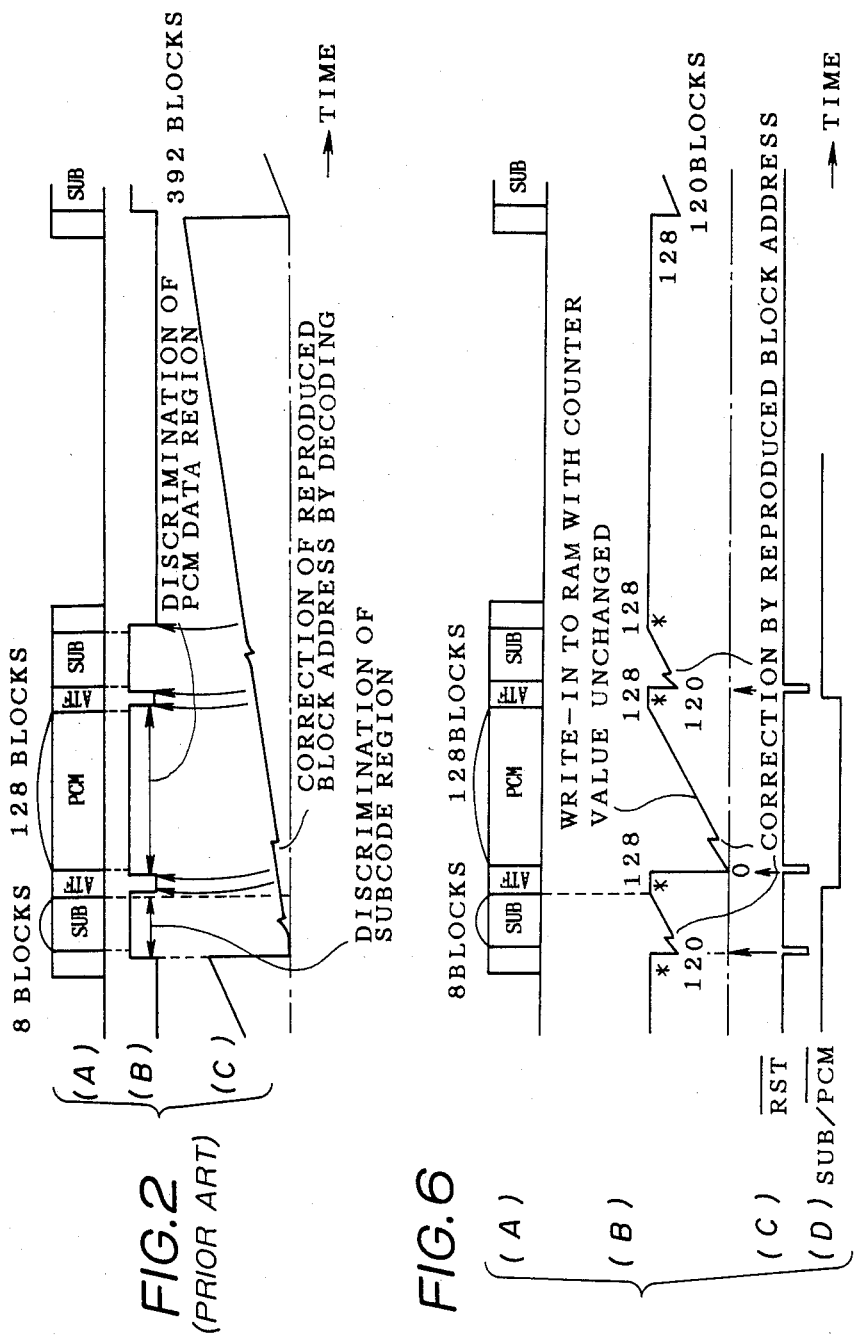

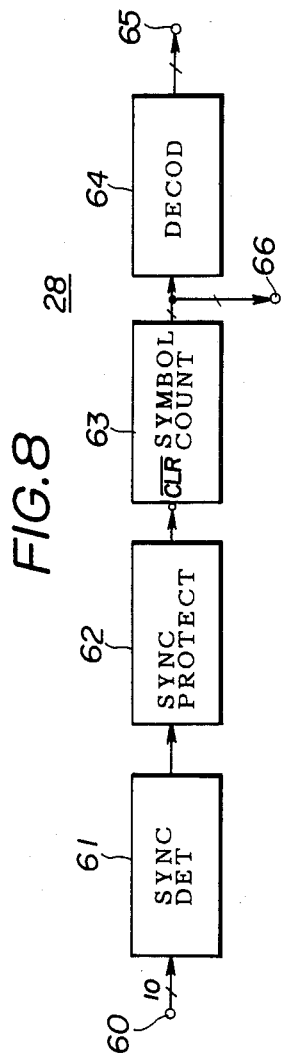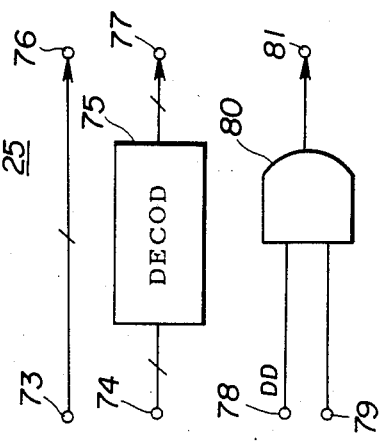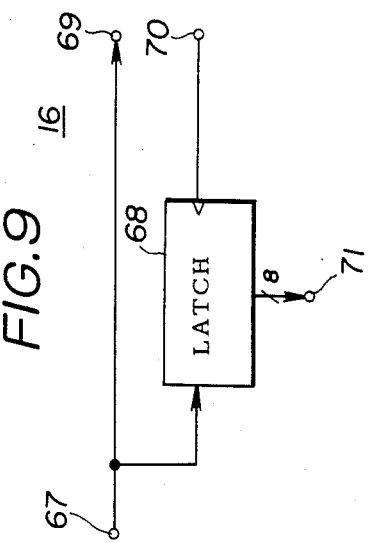

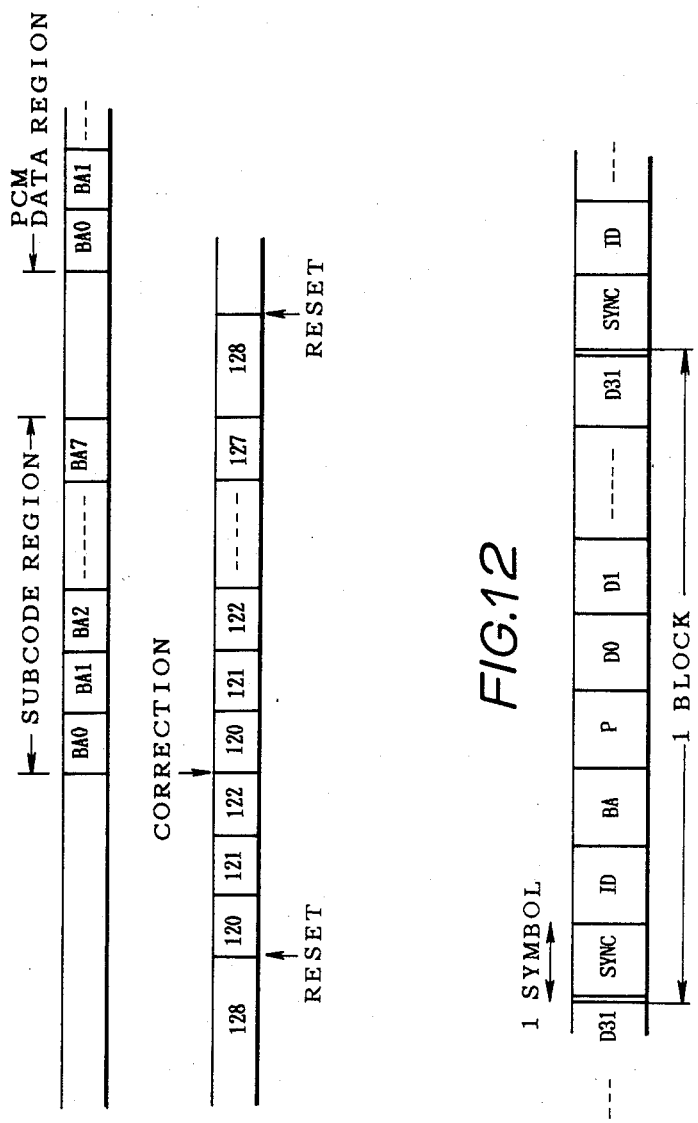

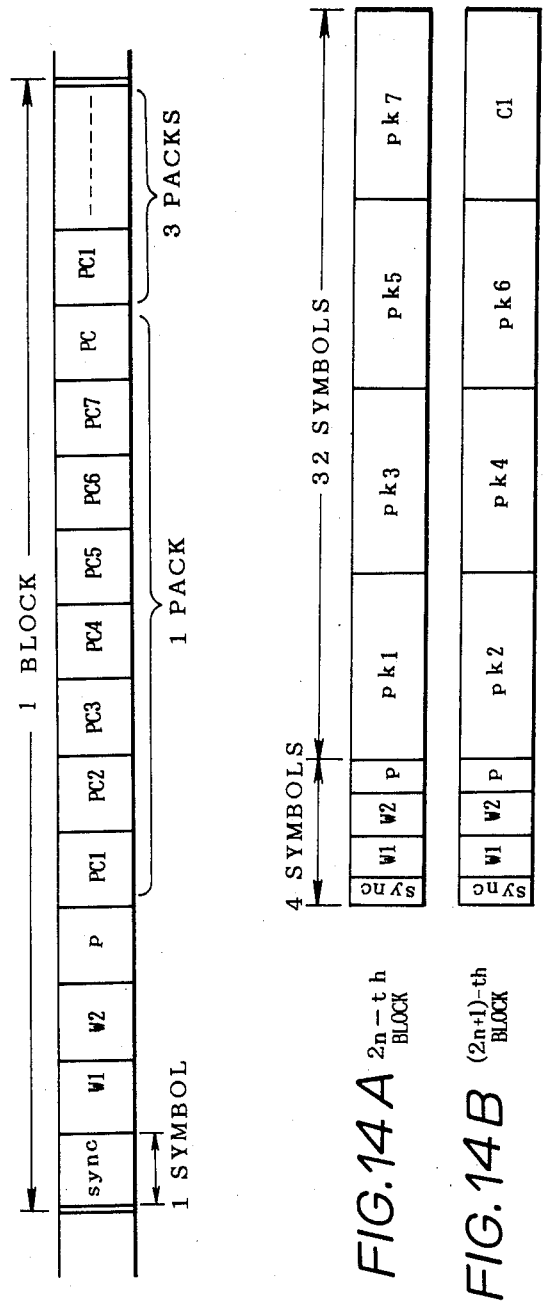

DIGITAL SIGNAL REPRODUCING APPARATUS

BACKGROUND OF THE INVENTION

The present invention generally relates to digital signal reproducing apparatuses, and more particularly to a digital signal reproducing apparatus which reproduces pre-recorded digital signals from a magnetic tape by use of rotary magnetic heads.

In a digital audio tape recorder, an analog audio signal is modulated into PCM audio data by a pulse code modulation (PCM), and the PCM audio data are recorded on and reproduced from a magnetic tape together with error detecting and correction codes and the like as PCM data. In a rotary head type digital audio tape recorder which employs rotary magnetic heads, data are successively recorded on and reproduced from tracks formed obliquely to a longitudinal direction of the magnetic tape without a guard band between two mutually adjacent tracks, alternately by a pair of rotary magnetic heads having gaps of mutually different azimuth angles. A tracking control signal (Automatic Track Find signal and hereinafter simply referred to as an ATF signal) is recorded on and reproduced from starting and ending portions of each track, while the PCM data are recorded and reproduced from an intermediate portion between the starting and ending portions of each track with a predetermined signal format.

The data are recorded on each track of the magnetic tape in blocks, and the starting and ending portions of the track are occupied by blocks of subcodes, the ATF signal and the like, while the intermediate portion (that is, the data region) between the starting and ending portions is occupied by blocks of the PCM data.

As will be described later in the present specification in conjunction with drawings, in a conventional digital signal reproducing apparatus, digital signals reproduced from the magnetic tape by the rotary magnetic heads are demodulated in a data demodulating circuit and are supplied to a random access memory (RAM). The data are also supplied to a synchronizing signal detector and block address reproducing circuit wherein a synchronizing signal and a block address is detected. The detected synchronizing signal and the block address are supplied to a write-in address control circuit. The write-in address control circuit operates a symbol address counter thereof by using the synchronizing signal as a reference and operates a block address counter thereof by using the block address as a reference, and the write-in address of the RAM is determined by outputs of these two address counters.

On the other hand, the reproduced digital signals are supplied to a tracking control signal detecting circuit which detects the ATF signal, and the detected ATF signal is supplied to a data region discriminating circuit. The data region discriminating circuit produces a data region discriminating signal by presuming from the ATF signal the region where the PCM data is recorded. The data region discriminating circuit determines the time period in which the synchronizing signal detector and block address reproducing circuit detects the synchronizing signal and the time period in which the write-in operation is carried out under the control of the write-in address control circuit.

However, the block address counter within the write-in address control circuit is designed to count from 0 to 392 blocks. Hence, when writing the PCM data reproduced from one track into the RAM, the counted value in the block address counter has already reached a predetermined value since the blocks of the subcode data, the ATF signal and the like are counted before the blocks of the PCM data. For this reason, in order to minimize unused addresses of the RAM and effectively utilize the memory capacity of the RAM, the output value of the block address counter must be decoded into a certain form. As a result, there is a problem in that a circuit is required exclusively for decoding the output value of the block address counter to the certain form.

Generally, the block address is loaded into the block address counter when the block address is correctly reproduced from the PCM data region. But since the counted value in the block address counter is already a predetermined value by the time the data are reproduced from PCM data region, it is necessary to add a certain value to the reproduced block address and load the added value to the block address counter. In other words, there is a problem in that a circuit is required exclusively for adding the certain value to the reproduced block address.

Furthermore, when producing the data region discriminating signal in the data region discriminating circuit, it is also necessary to generate timing signals by decoding an output value of a counter of the data region discriminating circuit. Hence, there is a problem in that a decoding circuit is required exclusively for decoding the output value of the counter in the data region discriminating circuit.

Therefore, the conventional digital signal reproducing apparatus suffers problems in that the circuit construction is complex due to the necessity to provide the circuits for decoding and adding.

On the other hand, a parity check circuit carries out a parity check on the demodulated reproduced data and supplies a load signal to the block address counter when no error is detected. However, a dropout may occur immediately after the reproduction of the synchronizing signal due to a scratch, dirt on the magnetic tape and the like. In addition, a data pattern identical to that of the synchronizing signal may occur due to a dropout. In these cases, there is a possibility that the parity check circuit will erroneously generate the load signal. When the parity check circuit erroneously generates the load signal, it is erroneously discriminated that no error exists in the block address, and the block address counter as a result outputs an erroneous block address. Therefore, there is a problem in that the PCM data will be written into erroneous addresses of the RAM.

SUMMARY OF THE INVENTION

Accordingly, it is a general object of the present invention to provide a novel and useful digital signal reproducing apparatus in which the problems described heretofore are eliminated.

Another and more specific object of the present invention is to provide a digital signal reproducing apparatus in which a block address counter is reset immediately before reproduction of a subcode region and a PCM data region on a magnetic tape to start a counting operation therefrom, and the counting operation of the block address counter is stopped when the reproduction of each of the subcode region and the PCM data region ends. According to the digital signal reproducing apparatus of the present invention, it is possible to write the reproduced data into a random access memory, without the need of a decoding circuit as in the case of the conventional reproducing apparatus. Compared to the conventional reproducing apparatus, it is possible to demodulate the reproduced data and obtain the write-in address for the random access memory by use of a circuit having a simple construction.

Still another object of the present invention is to provide a digital signal reproducing apparatus in which a value of a reproduced block address is discriminated as being correct only when the value of the reproduced block address is within a predetermined range predicted from a value of a previously reproduced block address. According to the digital signal reproducing apparatus of the present invention, it is possible to prevent an erroneous block address from being outputted as the reproduced block address, and the reliability of the reproduced block address is improved compared to the conventional reproducing apparatus.

A further object of the present invention is to provide a digital signal reproducing apparatus for reproducing digital signals pre-recorded on tracks formed obliquely to a longitudinal direction of a magnetic tape in blocks, where each of the tracks at least comprise a first region recorded with data and amounting to a first number of blocks, a second region recorded with a tracking control signal and amounting to a second number of blocks, and a third region recorded with data and amounting to a third number of blocks, and each of the blocks at least comprise a synchronizing signal, an identification code, a block address, a parity code and the data. The digital signal reproducing apparatus comprises a reproducing circuit for reproducing the digital signals from the tracks of the magnetic tape, a demodulating circuit for demodulating output reproduced digital signals from the reproducing circuit into demodulated reproduced data, a block address reproducing circuit supplied with the demodulated reproduced data from the demodulating circuit for outputting a block address in the demodulated reproduced data, a first circuit for detecting the tracking control signal from the reproduced data from the reproducing circuit and for producing a timing signal indicative of starting positions of each of the first and third regions by predicting the starting positions from a timing of the detected tracking control signal, a memory for storing the demodulated reproduced data from the demodulating circuit, a block address counter reset by the timing signal immediately before the start of each of the first and third regions for carrying out a counting operation and for outputting a counted value as a write-in address of the memory, and a second circuit for detecting the synchronizing signal from the reproduced data from the demodulating circuit and for at least producing a control signal for controlling a write-in timing of the demodulated reproduced data into the memory. The counted value is corrected by the block address from the block address reproducing circuit when the reproducing circuit starts to reproduce the digital signals from each of the first and third regions, and the block address counter stops the counting operation when the counted value reaches a predetermined value.

Another object of the present invention is to provide a digital signal reproducing apparatus which further comprises a parity check circuit for checking whether or not an error exists in a block address and an identification code of each block of the demodulated reproduced data from the demodulating circuit and for producing a predetermined signal when it is discriminated by a parity check operation that the block address is correctly reproduced, and a discriminating circuit for discriminating whether a value of the reproduced block address falls within a predetermined range predicted from a value of a previous block address and for producing an enable signal when the value of the reproduced block address falls within the predetermined range. The block address counter loads the reproduced block address from the block address reproducing circuit so as to correct the counted value only when both the predetermined signal and the enable signal exist.

Other objects and further features of the present invention will be apparent from the following detailed description when read in conjunction with the accompanying drawings.

BRIEF DESCRIPTION OF THE DRAWINGS

FIGS. 2(A) through 2(C) are timing charts for explaining the operation of the conventional apparatus shown in FIG. 1;

FIGS. 6(A) through 6(D) are timing charts for explaining the operation of the first embodiment shown in FIG. 3;

FIG. 8 is a system block diagram showing an embodiment of a synchronizing signal detector and symbol counter of the first embodiment;

FIG. 9 is a system block diagram showing an embodiment of a block address reproducing circuit of the first embodiment;

FIG. 10 is a system block diagram showing an embodiment of a write-in address control circuit of the first embodiment;

FIGS. 11A and 11B are diagrams for explaining the write-in of data during reproduction a subcode region on a magnetic tape;

FIG. 12 shows the construction of one block of data recorded in a PCM data region on the magnetic tape;

FIG. 13 shows the construction of one block of signals recorded in the subcode region on the magnetic tape;

FIGS. 14A and 14B show the construction of two successive blocks of signals recorded in the subcode region;

DETAILED DESCRIPTION

Figure 1:
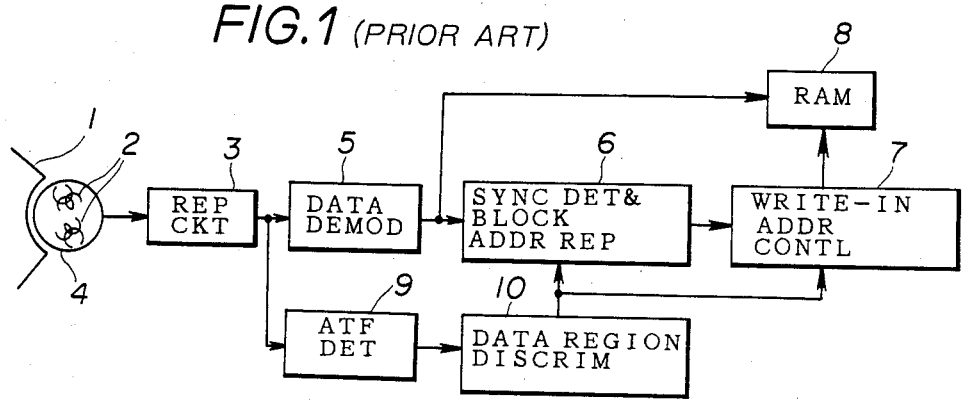
FIG. 1 is a system block diagram showing an example of the conventional digital signal reproducing apparatus.

First, a description will be given on the conventional digital signal reproducing apparatus so as to facilitate the understanding of the present invention. FIG. 1 shows an example of the conventional digital signal reproducing apparatus. The reproducing apparatus shown in FIG. 1 is disclosed in a Japanese Laid-Open Patent Application No. 61-107506, for example.

In FIG. 1, a digital signal reproduced from a magnetic tape 1 by a pair of rotary magnetic heads 2 has a signal format shown in FIG. 2(A). The tape 1 is wrapped obliquely around an outer peripheral surface of a rotary drum 4 which is mounted with the heads 2, and tracks are formed obliquely to a longitudinal direction of the tape 1. Each track on the tape 1 is generally divided into a subcode region constituted by 8 blocks of subcode data and the like, an ATF signal region constituted by 5 blocks of the ATF signal, a PCM data region constituted by 128 blocks of PCM audio data including error detecting codes and error correction codes, another ATF signal region constituted by 5 blocks of the ATF signal, and another subcode region constituted by 8 blocks of subcode data and the like. Actually, there are other regions constituted by 42 blocks of various other signals, and a total of 196 blocks of information are recorded in one track according to the standards set for the so-called R-DAT (rotary head type digital audio tape recorder). In FIG. 2(A) and FIG. 6(A) which will be described later, the subcode regions are denoted by "SUB", the ATF signal regions are denoted by "ATF", and the PCM data region is denoted by "PCM".

The PCM data recorded in the PCM data region are interleaved and include the PCM audio data, the error detecting and correction codes and the like. For this reason, when the data are reproduced from the PCM data region on the tape 1, it is necessary to know the location (block number) of the reproduced data, and normally, an address in a RAM 8 wherein the reproduced data are stored is determined by the reproduced block address and the symbol address within the block in this sequence.

The digital signals reproduced from the tape 1 by the heads 2 are passed through a reproducing circuit 3 and are supplied to a data demodulating circuit 5. The data demodulating circuit 5 demodulates the reproduced digital signals and supplies the demodulated reproduced data to the RAM 8. The reproduced data are also supplied to a synchronizing signal detector and block address reproducing circuit 6 wherein a synchronizing signal and a block address is detected. The detected synchronizing signal and the block address are supplied to a write-in address control circuit 7. The write-in address control circuit 7 operates a symbol address counter (not shown) thereof by using the synchronizing signal as a reference and operates a block address counter (not shown) thereof by using the block address as a reference, and the write-in address of the RAM 8 is determined by outputs of these two address counters.

On the other hand, the reproduced digital signals obtained through the reproducing circuit 3 are supplied to a tracking control signal detecting circuit 9 which detects the ATF signal, and the detected ATF signal is supplied to a data region discriminating circuit 10. The data region discriminating circuit 10 produces a data region discriminating signal shown in FIG. 2(B) by presuming from the ATF signal the region where the PCM data is recorded. The data region discriminating circuit 10 determines the time periods in which the synchronizing signal detector and block address reproducing circuit 6 detects the synchronizing signal and the write-in operation is carried out under the control of the write-in address control circuit 7.

However, the block address counter within the write-in address control circuit 7 is designed to count from 0 to 392 blocks as shown in FIG. 2(C). Hence, when writing the demodulated reproduced data from one track into the RAM 8, the counted value in the block address counter is already a predetermined value by this time since the blocks of the subcode data and the ATF signal are counted from a starting time $t_0$ before the blocks of the PCM data. For this reason, in order to minimize unused addresses of the RAM 8 and effectively utilize the memory capacity of the RAM 8, the output value of the block address counter must be decoded into a certain form. As a result, there is a problem in that a circuit is required exclusively for decoding the output value of the block address counter to the certain form.

Generally, the block address is loaded into the block address counter when the block address is correctly reproduced from the PCM data region. But since the counted value in the block address counter is already a predetermined value by the time the data are reproduced from the PCM data region, it is necessary to add a certain value to the reproduced block address and load he added value to the block address counter. In other words, there is a problem in that a circuit is required exclusively for adding the certain value to the reproduced block address.

In other words, when the starting block of the PCM data region is denoted by B1 and the ending block of the PCM data region is denoted by B2, a value (0+B1) must be loaded into the block address counter as the block address when the reproduced block address is "0". When the output value of the block address counter is used as it is to write the data into the RAM 8, the memory region of the RAM 8 from the address "0" to the address corresponding to the block (B1−1) will be unused, and the block addresses will be written starting from the address corresponding to the block B1 to the address corresponding to the block B2. In order to avoid such waste of memory space, the write-in of the data into the RAM 8 must start from the address "0", but in this case, there is a problem in that it is necessary to provide a circuit exclusively for subtracting from the output value of the block address counter the number of blocks from the start to the starting block B1 of the PCM data region. Similar problems occur when reproducing the subcode data from the subcode region.

Furthermore, when producing the data region discriminating signal shown in FIG. 2(B) in the data region discriminating circuit 10, it is also necessary to generate timing signals by decoding an output value of a counter (not shown) in the data region discriminating circuit 10. Hence, there is a problem in that a circuit is required exclusively for decoding the output value of the counter in the data region discriminating circuit 10.

Therefore, the conventional digital signal reproducing apparatus suffers problems in that the circuit construction is complex due to the necessity to provide the circuits for decoding and adding or subtraction.

The present invention provides a digital signal reproducing apparatus having a simple circuit construction and requiring no decoding and adding (or subtracting) circuits of the kind required in the conventional reproducing apparatus, but capable of obtaining the demodulated data, the write-in address of the demodulated data and the data region discriminating signal.

Figure 3:
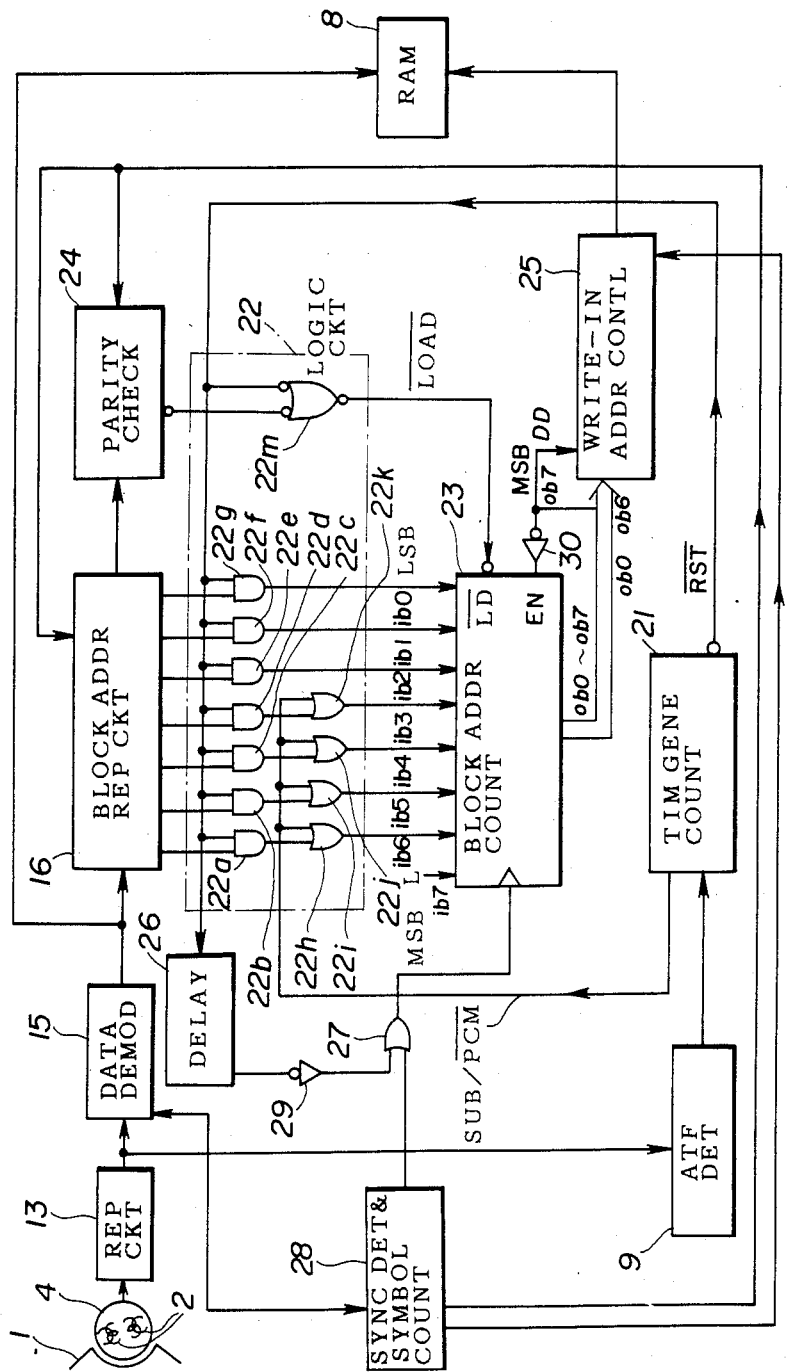
FIG. 3 is a system block diagram showing a first embodiment of the digital signal reproducing apparatus according to the present invention.

Next, a description will be given on a first embodiment of the digital signal reproducing apparatus according to the present invention, by referring to FIG. 3. In FIG. 3, those parts which are the same as those corresponding parts in FIG. 1 are designated by the same reference numerals, and a description thereof will be omitted. In FIG. 3, the digital signal reproduced from the tape 1 by the heads 2 are passed through a reproducing circuit 13 and are supplied to a data demodulating circuit 15.

Figure 4:
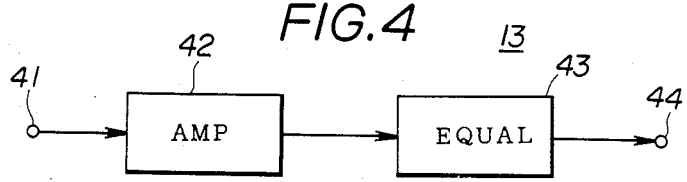
FIG. 4 is a system block diagram showing an embodiment of a reproducing circuit of the first embodiment.

In the present embodiment, the reproducing circuit 13 has a construction shown in FIG. 4. The reproducing circuit 13 comprises an amplifier 42 supplied with the reproduced digital signals from the heads 2 through a terminal 41, and a waveform equalizer 43 supplied with an amplified output of the amplifier 42. An output signal of the waveform equalizer 43 is supplied to the data demodulating circuit 15 and a tracking control signal detecting circuit 19 through a terminal 44.

Figure 5:
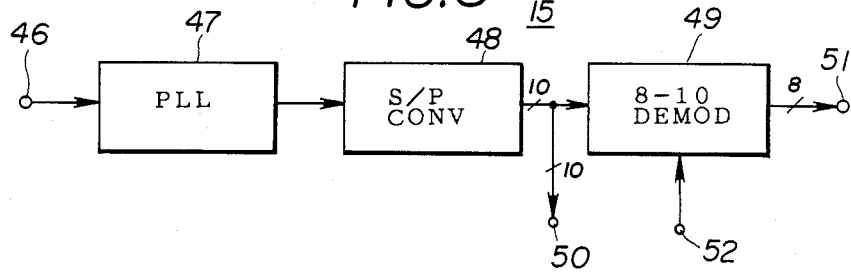
FIG. 5 is a system block diagram showing an embodiment of a data demodulating circuit of the first embodiment.

In the present embodiment, the data demodulating circuit 15 has a construction shown in FIG. 5. The data demodulating circuit 15 comprises a phase locked loop (PLL) circuit 47 supplied with the output signal of the reproducing circuit 13 through a terminal 46, a serial-to-parallel (S/P) converter 48 for converting every ten bits of the serial input (reproduced data and a bit clock signal in phase synchronism therewith) from the PLL circuit 47 into a 10-bit parallel output, for example, and an 8–10 demodulator 49 for demodulating the 10-bit parallel output of the S/P converter 48 into an 8-bit demodulated reproduced data responsive to a timing signal from a terminal 52. This timing signal from the terminal 52 is obtained from a synchronizing signal detector and symbol counter 28 shown in FIG. 3. The parallel output of the S/P converter 48 is also supplied to the synchronizing signal detector and symbol counter 28 through terminal means 50. An output 8-bit demodulated reproduced data of the 8–10 demodulator 49 is supplied to a block address reproducing circuit 16 and the RAM 8 through terminal means 51.

The detected ATF signal from the tracking control signal detecting circuit 9 having a known construction is supplied to a timing generating counter 21 which carries out a counting operation by using the time position of the detected ATF signal as a reference time position, and decodes the counted value to produce a signal SUB/$\overline{PCM}$ shown in FIG. 6(D) and a reset signal $\overline{RST}$ shown in FIG. 6(C). When no ATF signal can be detected in the tracking control signal detecting circuit 9, the signal SUB/$\overline{PCM}$ and the reset signal $\overline{RST}$ may be produced by counting drum pulses indicative of a rotation frequency of the rotary drum 4. The signal SUB/$\overline{PCM}$ has a high level during reproduction of the subcode region and has a low level during reproduction of the PCM data region. On the other hand, the reset signal $\overline{RST}$ has a low level immediately before reproduction of the subcode region and immediately before reproduction of the PCM data region. The reset signal $\overline{RST}$ is supplied to a logic circuit 22.

The timing of the reset signal $\overline{RST}$ is set within such a range that the low-level portion does not extend within the subcode and PCM data regions, by taking into account the jitter and the like in the mechanical system of the reproducing apparatus. In the timing generating counter 21, it is necessary to decode the timing three times in each track, but no other decoding is required.

Figure 7:
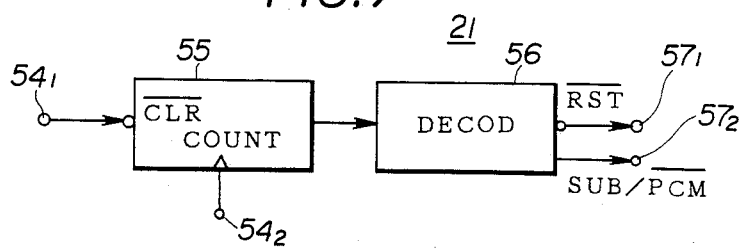
FIG. 7 is a system block diagram showing an embodiment of a timing generating counter of the first embodiment.

In the present embodiment, the timing generating counter 21 has a construction shown in FIG. 7. The timing generating counter 21 comprises a counter 55 having a clear terminal $\overline{CLR}$ supplied with the detected ATF signal from the ATF signal detecting circuit 9 through a terminal $54_1$ and counting a clock signal supplied from a crystal master clock generator (not shown) through a terminal $54_2$, and a decoder 56 for decoding an output of the counter 55. The signal SUB/$\overline{PCM}$ and the reset signal $\overline{RST}$ produced from the decoder 56 are supplied to logic circuit 22 through terminals $57_1$ and $57_2$, respectively.

The reset signal $\overline{RST}$ is passed through a delay circuit 26 and a gate 29 for the purpose of matching the timing of the reset signal $\overline{RST}$ with that of a timing signal obtained from the synchronizing signal detector and symbol counter 28. The timing signal which is obtained from the synchronizing signal detector and symbol counter 28 and supplied to an OR circuit 27 is a clock signal made up of pulses which are generated once for every block. The OR circuit 27 is also supplied with the reset signal $\overline{RST}$ from the gate 29. An output pulse signal of the OR circuit 27 is applied to a clock terminal of a block address counter 23. The synchronizing signal detector and symbol counter 28 also supplies a timing signal to the data demodulating circuit 15, the block address reproducing circuit 16, and a parity check circuit 24 having a known construction.

In the present embodiment, the synchronizing signal detector and symbol counter 28 has a construction shown in FIG. 8. The synchronizing signal detector and symbol counter 28 comprises a synchronizing signal detector 61, a synchronizing signal protecting circuit 62, a symbol counter 63, and a decoder 64. The 10-bit parallel output of the S/P converter 48 shown in FIG. 5 is applied to terminal means 60 through the terminal means 50, and is supplied to the synchronizing signal detector 61 wherein the synchronizing signal is detected. The detected synchronizing signal from the synchronizing signal detector 61 is supplied to a synchronizing signal protecting circuit 62. The synchronizing signal protecting circuit 62 closes a gate thereof for a predetermined time until the next synchronizing signal is received, so as not to erroneously detect other signals as the synchronizing signal. A symbol counter 63 is cleared by the synchronizing signal supplied through the synchronizing signal protecting circuit 62, and counts a clock signal (not shown) which is obtained by dividing the frequency of the bit clock signal by ten. An output symbol address of the symbol counter 63 is decoded in the decoder 64, and various timing signals are produced from the decoder 64 and outputted via terminal means 65. In addition, the output symbol address of the symbol counter 63 is also supplied to the write-in address control circuit 25 through terminal means 66.

Further, in the present embodiment, the block address reproducing circuit 16 has a construction shown in FIG. 9. The block address reproducing circuit 16 comprises a latch circuit 68 supplied with the demodulated reproduced data (block address) from the data demodulating circuit 15 through a terminal 67. The timing signal from the synchronizing signal detector and symbol counter 28 is applied to a clock terminal of the latch circuit 68 through a terminal 70. The demodulated reproduced data from the terminal 67 is supplied as it is to the parity check circuit 24 through a terminal 69. The latched block address from the latch circuit 68 is supplied to the logic circuit 22 through terminal means 71.

The reset signal $\overline{RST}$ from the timing generating counter 21 and the block address from the block address reproducing circuit 16 are supplied to AND gates 22a through 22g of the logic circuit 22. The three least significant bits of the block address are supplied directly from the AND gates 22e through 22g to lower bit input terminals ib2, ib1 and ib0 of the block address counter 23. On the other hand, the four most significant bits of the block address are passed through OR gates 22h through 22k and are supplied to higher bit input terminals ib6, ib5, ib4 and ib3 of the block address counter 23. The OR gates 22h through 22k are supplied with the signal SUB/$\overline{PCM}$ from the timing generating counter 21. A low-level signal is constantly applied to a most significant bit input terminal ib7 of the block address counter 23. The block address counter 23 is reset to (loaded with) "0" by the reset signal $\overline{RST}$ immediately before the start of the PCM data region and thereafter increments the count as shown in FIG. 6(B) for each block. FIG. 6(A) shows the signal format of the reproduced digital signal and is identical to FIG. 2(A) described before.

When the block address is correctly reproduced after the PCM data region is reached, a load signal LOAD is applied to a load terminal $\overline{LD}$ of the block address counter 23. This load signal $\overline{LOAD}$ is obtained from a negative logic OR gate 22m which is supplied with an output signal of the parity check circuit 24 and the reset signal $\overline{RST}$ from the timing generating counter 21. Hence, the block address which is correctly reproduced is loaded into the block address counter 23 responsive to the load signal $\overline{LOAD}$, and the counted value in the block address counter 23 is corrected by use of the loaded block address.

The block address counter 23 is reset to "0" immediately before the PCM data region starts. Hence, there is no need to add a predetermined value to the reproduced block address nor decode the reproduced block address. When the counted value in the block address counter 23 reaches a predetermined value (for example, 128 blocks) after entering the PCM data region, the counting operation is stopped, and a high-level signal DD is continuously obtained from a most significant bit output terminal ob7 of the block address counter 23. This high-level signal DD corresponds to the data region discriminating signal shown in FIG. 2(B) described before. The data region discriminating signal DD is supplied to the write-in address control circuit 25 on one hand, and is supplied to an enable terminal EN of the block address counter 23 through an inverter 30.

The block address obtained from bit output terminals ob0 through ob6 of the block address counter 23 is supplied to the write-in address control circuit 25, and this block address is supplied to the RAM 8. The write-in address control circuit 25 also supplies a decoded symbol address and a write-in control signal (or write enable signal) to the RAM 8. The decoded symbol address is obtained by decoding the symbol address from the synchronizing signal detector and symbol counter 28.

In the present embodiment, the write-in address control circuit 25 has a construction shown in FIG. 10. The write-in address control circuit 25 comprises a decoder 75 and an AND circuit 80. The block address from the block address counter 23 is applied to terminal means 73 and is supplied as it is to the RAM 8 through terminal means 76. The symbol address from the symbol counter 63 of the synchronizing signal detector and symbol counter 28 is applied to terminal means 74 and is decoded in the decoder 75. An output decoded symbol address of the decoder 75 is supplied to the RAM 8 through terminal means 77. On the other hand, the data region discriminating signal DD from the block address counter 23 is applied to a terminal 78 and is supplied to one input terminal of the AND circuit 80. A timing signal from the synchronizing signal detector and symbol counter 28 is applied to a terminal 79 and is supplied to the other input terminal of the AND circuit 80. An output signal of the AND circuit 80 is supplied to the RAM 8 through a terminal 81 as the write-in control signal (write enable signal).

By use of the data region discriminating signal DD and the signal SUB/$\overline{PCM}$, it is possible to accurately restrict the write-in time period for the PCM data reproduced from the PCM data region and the subcode data reproduced from the subcode region. In the write-in address control circuit 25, there is no need to decode the output counted value of the block address counter 23 as in the case of the conventional reproducing apparatus, and the output counted value of the block address counter 23 can be supplied as it is to the RAM 8 as upper bits of the write-in address.

In addition, the write-in address is started from "0". Hence, even when the actual block address "0" is not reproduced, the data at the address "0" of the RAM 8 are rewritten by the reproduced data from the block address "0" or by the random error data. The random error data are detected and adequately processed (corrected, interpolated or muted) when the data are read out and utilized, and there is virtually no possibility of an abnormal noise being generated when the data of the previous frame is read out from the RAM 8 and reproduced.

Next, a description will be given on the subcode region. When the high-level signal SUB/$\overline{PCM}$ shown in FIG. 6(D) obtained from the timing generating counter 21 is supplied to the OR gates 22h through 22k of the logic circuit 22, the outputs of these OR gates 22h through 22k become high regardless of the output signal level of the AND gates 22a through 22d. Hence, a high-level signal is supplied to the input terminals ib3 through ib6 of the block address counter 23. Accordingly, the block address counter 23 is not reset to (loaded with) zero but is reset to "120". Thereafter, when the block address is correctly reproduced, the address value of the reproduced block address is loaded into the block address counter 23, but in this state, the high-level signal is supplied to each of the input terminals ib3 through ib6. For this reason, the block address counter 23 starts the counting operation from the 120th block as shown in FIG. 11B. FIG. 11A shows the reproduced signal, where BA0, BA1, . . . denote the block addresses. FIG. 11B shows the counted value in the block address counter 23 in correspondence with the block address of the reproduced signal shown in FIG. 11A.

Therefore, after the block address counter 23 is reset at the 120th block during reproduction of the subcode region, the block address counter 23 continues the normal counting operation as in the case of the counting operation during reproduction of the PCM data region, and the counting operation is stopped when the 128th block is reached. In other words, it is necessary to start the counting operation from the 120th block in order to count the address blocks in the 8-block subcode region and to stop the counting operation in the subcode region at the 128th block.

In FIG. 6(B), a symbol "*" indicates the time when the counting operation of the block address counter 23 is stopped. The time period in which the counting operation is stopped and the counted address value is "128", is the time period which does not correspond to the SUB or PCM data region.

Next, a more detailed description will first be given on the construction of the blocks of data recorded in the PCM data region and the subcode region on the tape 1.

FIG. 12 shows the construction of one block of data recorded in the PCM data region. A synchronizing signal SYNC amounting to one symbol is arranged at the beginning of the block, and an identification code ID amounting to one symbol, a block address BA amounting to one symbol, a parity code P amounting to one symbol and PCM data amounting to thirty-two symbols follow the synchronizing signal SYNC in this sequence. The PCM data amounting to the thirty-two symbols are denoted by D0 through D31, and each symbol comprises 8 bits. The PCM data is made up of the PCM audio data which is obtained by pulse-code-modulating an analog audio signal, error detecting and correction codes. The block address BA at the third symbol of the block indicates the position of the block in the 128 blocks of PCM data by the seven lower bits thereof. The parity code P at the fourth symbol of the block is used as a parity code for detecting an error in the identification code ID and the block address BA. Accordingly, it is discriminated that no error exists when modulo-two additions of the corresponding bits of the identification code ID, the block address BA and the parity code P lead to zero.

On the other hand, FIG. 13 shows the construction of one block of signals recorded in the subcode region. One block comprises a synchronizing signal sync amounting to one symbol, words W1 and W2 each amounting to one symbol, a parity code p amounting to one symbol, subcode data PC1 through PC7 and parity codes PC each amounting to one symbol. The word W1 and the second through fourth bits from the MSB of the word W2 constitute an identification code, and lower four bits of the word W2 indicate the block address. In addition, the parity code p at the fourth symbol of the block is used for detecting an error in the words W1 and W2, and in the subsequent symbols the parity code PC at every eighth symbol is used for detecting an error in the subcode data PC1 through PC7. The subcode data PC1 through PC7 and the parity code PC constitute one pack, and four packs are time sequentially arranged subsequent to the first our symbols (sync, W1, W2 and p) in one block of signals recorded in the subcode region.

FIGS. 14A and 14B show the construction of two successive blocks of signals recorded in the subcode region. As shown in FIGS. 14A and 14B, the signals recorded in the subcode region are completed in two successive blocks. With respect to packs pk1 through pk7 in the 2n-th block shown in FIG. 14A and the (2n+1)-th block shown in FIG. 14B, a code C1 is inserted n the last pack of the (2n+1)-th block as an error detecting and correction code.

The PCM data amounting to thirty-two symbols in each block recorded in the PCM data region are interleaved so as to prevent burst error. For this reason, both the PCM data and the absolute position of the PCM data must be reproduced accurately when demodulating the reproduced signals. This absolute position of the PCM data is indicated by the block address and the symbol address.

Figure 15:
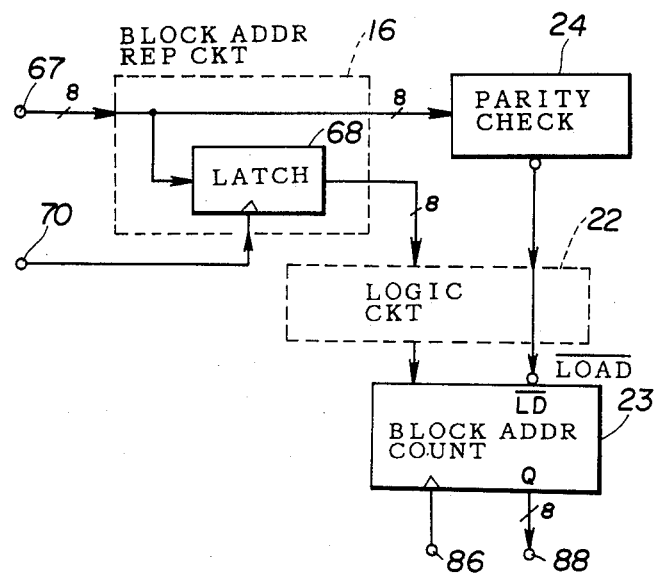
FIG. 15 is a system block diagram showing block address reproducing circuit part of the first embodiment.

Next, a description will be given on the problems of loading the block address into the block address counter 23 described before in conjunction with FIG. 3, by referring to FIG. 15. As shown in FIG. 15, the block address reproducing circuit 16 comprises the latch circuit 68 described before in conjunction with FIG. 9. The demodulated reproduced data from the data demodulating circuit 15 shown in FIG. 3 are applied to the terminal 67 and are supplied to the latch circuit 68 and the parity check circuit 24.

The parity check circuit 24 performs modulo-two additions of the corresponding bits of the identification code ID, the block address BA and the parity code P, and supplies the load signal $\overline{LOAD}$ to the load terminal LD of the block address counter 23 when the modulo-two additions lead to zero. As described before, the latch circuit 68 latches the block address, and the latched block address is supplied to the block address counter 23 through the logic circuit 22 with the upper four bits of the block address set to "1" when the demodulated reproduced data is reproduced from the subcode region and as it is when the demodulated reproduced data is reproduced from the PCM data region. The block address counter 23 loads the block address when the load signal $\overline{LOAD}$ is received, and increments the counted value in synchronism with the reproduction of the block address responsive to the output pulse signal (clock signal) of the OR circuit 27 received through a terminal 86. The counted value in the block address counter 23 is outputted through terminal means 88.

However, a dropout may occur immediately after the reproduction of the synchronizing signal due to a scratch, dirt and the like on the tape 1. In addition, a data pattern identical to that of the synchronizing signal may occur due to a dropout. In these cases, there is a possibility that the parity check circuit 24 will erroneously generate the load signal $\overline{LOAD}$, and the probability of such an erroneous generation of the load signal $\overline{LOAD}$ is $\frac{1}{8}$. When the parity check circuit 24 erroneously generates the load signal $\overline{LOAD}$, it is erroneously discriminated that no error exists in the block address, and the block address counter 23 as a result outputs an erroneous block address. Therefore, there is a problem in that the PCM data will be written into erroneous addresses of the RAM.

Figure 16:
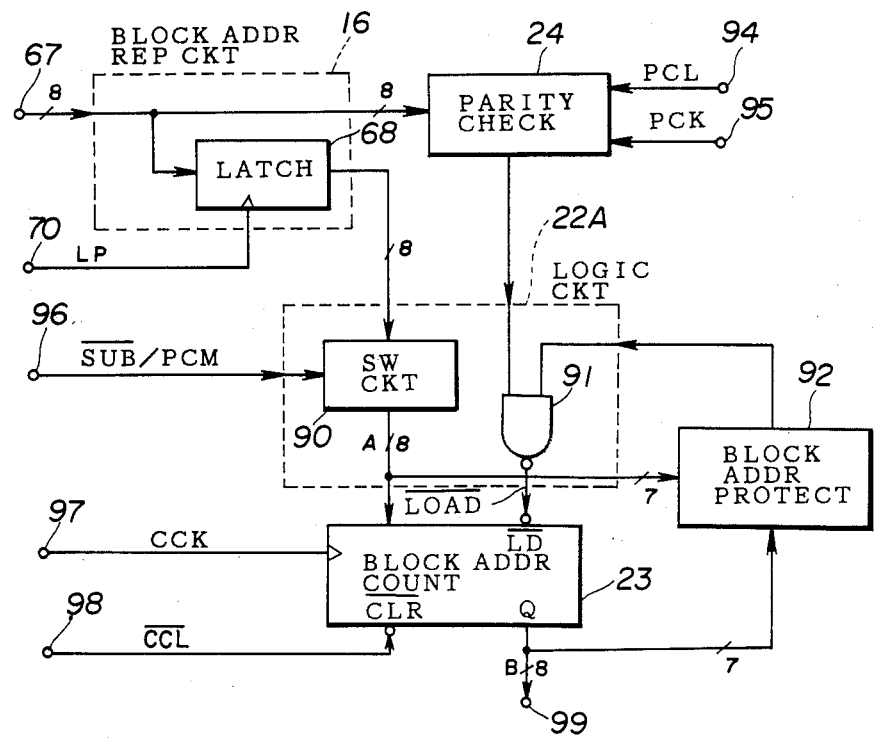
FIG. 16 is a system block diagram showing an essential part of a second embodiment of the digital signal reproducing apparatus according to the present invention.

Next, a description will be given on a second embodiment of the digital signal reproducing apparatus according to the present invention in which the above described problems are eliminated. FIG. 16 shows an essential part of the second embodiment, and in FIG. 16, those parts which are the same as those corresponding parts in FIGS. 3 and 9 are designated by the same reference numerals, and a description thereof will be omitted. The present embodiment is characterized by the provision of a block address protecting circuit 92.

Figure 17:
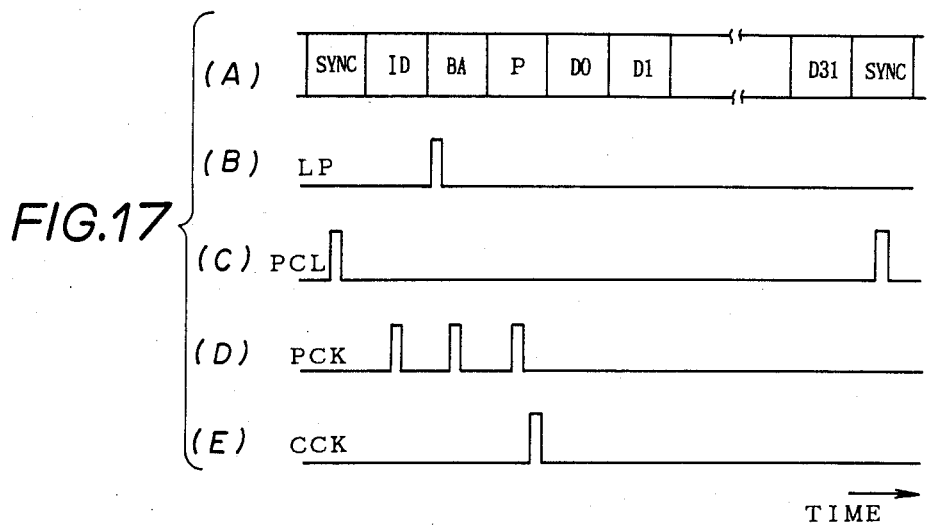
FIGS. 17(A) through 17(E) are timing charts for explaining the operation of the second embodiment shown in FIG. 16.

In the present embodiment, a logic circuit 22A comprises a switching circuit 90 and a 2-input NAND circuit 91. The demodulated reproduced data from the terminal 67 are supplied to the latch circuit 68 which constitutes the block address reproducing circuit 16 and to the parity check circuit 24. The parity check circuit 24 is also supplied with the timing signals which are produced by the synchronizing signal detector and symbol counter 28 shown in FIG. 3 and obtained through terminals 94 and 95. The timing signal obtained from the terminal 94 will hereinafter be referred to as a parity clear signal PCL, and the timing signal obtained from the terminal 95 will hereinafter be referred to as a parity clock signal PCK. The parity clear signal PCL is synchronized to the synchronizing signal SYNC of each block in the PCM data shown in FIG. 17(A) reproduced from the PCM data region, as shown in FIG. 17(C). The parity clock signal PCK is synchronized to each symbol constituting the identification code ID, the block address BA and the parity code P, as shown in FIG. 17(D).

The internal state of the parity check circuit 24 is cleared when supplied with the parity clear signal PCL, and performs the modulo-two additions of the corresponding bits of the identification code ID, the block address BA and the parity code P in each block when supplied with the parity clock signal PCK. When the calculated result of the modulo-two additions is "0" for all of the eight bits, the parity check circuit 24 produces a parity check signal having a logic level "1" to indicate that no error exists. The parity check signal is supplied to one input terminal of the NAND circuit 91.

The timing signal which is obtained from the synchronizing signal detector and symbol counter 28 through the terminal 70 will hereinafter be referred to as a latch pulse signal LP. The latch circuit 68 is supplied with the latch pulse signal LP shown in FIG. 17(B) from the terminal 70, and latches the block address responsive to this latch pulse signal LP. The latched block address is supplied to the switching circuit 90.

On the other hand, when the signals are reproduced from the subcode region, a latch pulse signal, a parity clear signal and a parity clock signal similar to those shown in FIGS. 17(B) through 17(D) are applied to the terminals 70, 94 and 95. In this case, the parity clock signal is synchronized to the words W1 and W2 and the parity code p shown in FIG. 13.

A signal $\overline{SUB/PCM}$ which has the logic value "0" when reproducing the subcode region and the logic value "1" when reproducing the PCM data region is applied to a terminal 96 from the timing generating counter 21 shown in FIG. 3. This signal $\overline{SUB/PCM}$ is obtained by merely inverting the signal SUB/$\overline{PCM}$ described before in conjunction with the first embodiment. The signal $\overline{SUB/PCM}$ is supplied to the switching circuit 90, and the switching circuit 90 obtains a logical product of the upper four bits in the 8-bit block address from the latch circuit 68 and the signal $\overline{SUB/PCM}$. An 8-bit block address obtained from the switching circuit 90 is supplied to the block address counter 23 and the block address protecting circuit 92.

Figure 18:
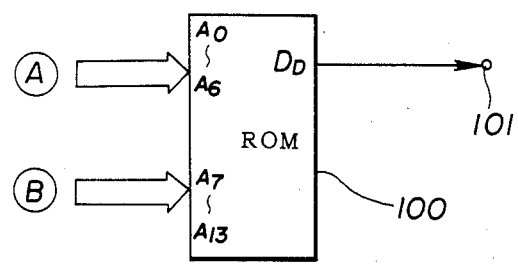
FIGS. 18(A) and (B) show embodiments of a block address protecting circuit which constitutes an essential part of the second embodiment.

The block address protecting circuit 92 is supplied with the reproduced block address (hereinafter referred to as a block address A) from the switching circuit 90 and the block address (hereinafter referred to as a block address B) outputted from the block address counter 23. In the present embodiment, the block address protecting circuit 92 is made up of a read only memory (ROM) 100 shown in FIG. 18 which is accessed by a 14-bit address. The lower seven bits of the block address A are supplied to the ROM 100 as address bits A0 through A6, and the lower seven bits of the block address B are supplied to the ROM 100 as address bits A7 through A13. The ROM 100 pre-stores the data (look-up table) shown in the following Table at the addresses designated by the address bits A0 through A13. In the Table, the address values designated by the address bits A0 through A6 and the address bits A7 through A13 are respectively indicated in decimal numbers.

TABLE

| A7–A13, B | A0–A6, A | | | | | | | | | | |
|---|---|---|---|---|---|---|---|---|---|---|---|
| | 0 | 1 | 2 | 3 | 4 | 5 | 6 | 7 | 8 | — | 127 |
| 0 | 1 | 1 | 1 | 1 | 1 | 0 | 0 | 0 | 0 | — | 0 |
| 1 | 1 | 1 | 1 | 1 | 1 | 0 | 0 | 0 | 0 | — | 0 |
| 2 | 0 | 1 | 1 | 1 | 1 | 1 | 0 | 0 | 0 | — | 0 |
| 3 | 0 | 0 | 1 | 1 | 1 | 1 | 1 | 0 | 0 | — | 0 |
| 4 | 0 | 0 | 0 | 1 | 1 | 1 | 1 | 1 | 0 | — | 0 |
| 5 | 0 | 0 | 0 | 0 | 1 | 1 | 1 | 1 | 1 | 0 — | 0 |
| . | | | | | . | | | | | | |
| . | | | | | . | | | | | | |
| . | | | | | . | | | | | | |
| 127 | 0 | | | | | | | — | | 0 0 1 | 1 |

When the block address B takes a value from "1" to "127", a logic value "1" is outputted from a terminal D0 of the ROM 100 when the block address A takes a value within a range (X±2) and a logic value "0" is otherwise outputted from the terminal D0, where X is a value obtained by incrementing the value of the block address B by one. In other words, when the block address B takes a value "3", for example, the logic value "1" is outputted from the terminal D0 when the block address A takes a value within a range of "2" to "6". On the other hand, when the block address B takes a value "0", the logic value "1" is outputted from the terminal D0 when the block address A takes a value within a range of "0" to "4". In this latter case, the logic value "1" is outputted from the terminal D0 even when the block address A takes the value "4" so as to allow for a certain margin, because the timing of a counter clear signal $\overline{CCL}$ for clearing the block address counter 23 may shift by a few blocks due to a jitter in the rotation of the rotary drum 4 which is mounted with the heads 2. The counter clear signal $\overline{CCL}$ will be described later.

Accordingly, the block address protecting circuit 92 outputs the logic value "1" when the value of the block address A from the switching circuit 90 falls within a predetermined range with respect to the block address B from the block address counter 23. This logic value "1" from the terminal D0 is outputted as an enable signal through a terminal 101. This enable signal from the block address protecting circuit 92 is supplied to the other input terminal of the NAND circuit 91.

The NAND circuit 91 produces a load signal $\overline{LOAD}$ having a logic value "0" only when both the enable signal from the block address protecting circuit 92 and the parity check signal from the parity check circuit 24 have the logic value "1". The load signal $\overline{LOAD}$ from the NAND circuit 91 is applied to the load terminal $\overline{LD}$ of the block address counter 23.

The counter clear signal $\overline{CCL}$ which becomes low immediately before the reproduction of the subcode region starts and immediately before the reproduction of the PCM data region starts is applied to a terminal 98 and is supplied to the clear terminal $\overline{CLR}$ of the block address counter 23. The block address counter 23 is accordingly cleared by this low-level counter clear signal $\overline{CCL}$. For example, the reset signal $\overline{RST}$ generated in the timing generating counter 21 described before may be used as this counter clear signal $\overline{CCL}$. After the block address counter 23 is cleared, the reproduced block address A from the switching circuit 90 is loaded into the block address counter 23 when the load signal $\overline{LOAD}$ having the logic value "0" (that is, low-level load signal $\overline{LOAD}$) is received from the NAND circuit 91 of the logic circuit 22A.

When no low-level load signal $\overline{LOAD}$ is applied to the load terminal $\overline{LD}$ of the block address counter 23, the block address counter 23 increments the count by one responsive to a counter clock signal CCK shown in FIG. 17(E) which is obtained from a terminal 97. The counter clock signal CCK is synchronized to each parity code P within the block in the PCM data region and to each parity code p within the block in the subcode region, and corresponds to the output pulse signal of the OR circuit 27 shown in FIG. 3.

The 8-bit block address B outputted from terminal means Q of the block address counter 23 is supplied to the block address protecting circuit 92 as described before and also to terminal means 99. The block address B from the terminal means 99 is supplied to the write-in address control circuit 25 shown in FIG. 3.

Accordingly, even when the parity check circuit 24 discriminates that no error exists, the reproduced block address A will not be loaded into the block address counter 23 unless the value of the reproduced block address A falls within a predetermined range predicted from the value of the block address B. In other words, in a case where a dropout occurs immediately after the reproduction of the synchronizing signal but the parity check circuit 24 discriminates that no error exists, the reproduced block address A will not be loaded when it has a random value which does not fall within the predetermined range predicted from the value of the previous block address B. As a result, the reliability of the block address B is improved compared to the conventional reproducing apparatus. It is therefore possible to positively prevent inconveniences such as not writing the data at addresses within a data interleaving region of the RAM 8 where the data should be written, write-in of data into the RAM 8 at incorrect addresses within the data interleaving memory region, and leaving previous data as it is even when a correct block address is not reproduced.

In the Table described before, the range in which the block address A should fall in order for the block address protecting circuit 92 to produce the high-level enable signal in accordance with the reproduced block address B is set to (X±2). However, the range is not limited to (X±2), and may be set arbitrarily by taking into account the jitter in the rotation of the rotary drum 4, the accuracy of each part of the reproducing apparatus and the like.

Further, the present invention is not limited to these embodiments, but various variations and modifications may be made without departing from the scope of the present invention.

What is claimed is:

1. A digital signal reproducing apparatus for reproducing digital signals pre-recorded on tracks formed obliquely to a longitudinal direction of a magnetic tape in blocks, each of said tracks at least comprising a first region recorded with data and amounting to a first number of blocks, a second region recorded with a tracking control signal and amounting to a second number of blocks, and a third region recorded with data and amounting to a third number of blocks, each of said blocks at least comprising a synchronizing signal, an identification code, a block address, a parity code and the data, said digital signal reproducing apparatus comprising:

reproducing means for reproducing the digital signals from the tracks of the magnetic tape;

demodulating means for demodulating output reproduced digital signals from said reproducing means into demodulated reproduced data;

block address reproducing means supplied with the demodulated reproduced data from said demodulating means for outputting a block address in the demodulated reproduced data;

first means for detecting the tracking control signal from the reproduced data from said reproducing means and for producing a timing signal indicative of starting positions of each of the first and third regions by predicting the starting positions from a timing of the detected tracking control signal;

memory means for storing the demodulated reproduced data from said demodulating means;

block address counter means reset by said timing signal immediately before the start of each of the first and third regions for carrying out a counting operation and for outputting a counted value as a write-in address of said memory means, said counted value being corrected by the block address from said block address reproducing means when said reproducing means starts to reproduce the digital signals from each of the first and third regions, said block address counter means stopping the counting operation when the counted value reaches a predetermined value; and second means for detecting the synchronizing signal from the reproduced data from said demodulating means and for at least producing a control signal for controlling a write-in timing of the demodulated reproduced data into said memory means.

2. A digital signal reproducing apparatus as claimed in claim 1 in which said first region is recorded with subcode data and comprises eight (8) blocks, said second region comprises five (5) blocks, and said third region is recorded with PCM data and comprises one hundred twenty-eight (128) blocks, said predetermined value being set to one hundred twenty-eight (128), said block address counter means being reset responsive to said timing signal to zero (0) immediately before reproduction of the second region starts and to one hundred twenty (120) immediately before reproduction of the first region starts.

3. A digital signal reproducing apparatus as claimed in claim 1 which further comprises parity check means for checking whether or not an error exists in each block of the demodulated reproduced data from said demodulating means and for producing a predetermined signal when it is discriminated that the block address is correctly reproduced, said block address counter means loading the block address from said block address reproducing means responsive to said predetermined signal so as to correct said counted value.

4. A digital signal reproducing apparatus as claimed in claim 1 in which further comprises parity check means for checking whether or not an error exists in the block address and the identification code of each block of the demodulated reproduced data from said demodulating means and for producing a predetermined signal when it is discriminated that the block address is correctly reproduced, and discriminating means for discriminating whether a value of the reproduced block address falls within a predetermined range predicted from a previous counted value of the block address counter means and for producing an enable signal when the value of the reproduced block address falls within said predetermined range, said block address counter means loading the block address from said block address reproducing means so as to correct said counted value only when both said predetermined signal and said enable signal exist.

5. A digital signal reproducing apparatus as claimed in claim 4 in which said discriminating means comprises a memory which pre-stores a look-up table containing data for predicting a range of values the reproduced block address should take based on the previous counted value of the block address counter means when the synchronizing signal detected in said second means is a true synchronizing signal.

* * * * *